United States Patent
Okada et al.

[15] 3,697,525
[45] Oct. 10, 1972

[54] FLUORESCENT NAPHTHALIMIDE DERIVATIVES

[72] Inventors: Hitoshi Okada; Seiichi Imahori; Susumu Hirako, all of Tokyo, Japan

[73] Assignee: Mitsubishi Chemical Industries, Limited, Tokyo, Japan

[22] Filed: June 4, 1969

[21] Appl. No.: 830,504

[30] Foreign Application Priority Data

June 8, 1968  Japan ...................43/39102
June 8, 1968  Japan ...................43/39103
June 8, 1968  Japan ...................43/44712

[52] U.S. Cl. ............................260/281, 8/512, 8/55
[51] Int. Cl. ..........................................C07l 39/00
[58] Field of Search.................................260/281

[56] References Cited

UNITED STATES PATENTS 3,310,564  3/1967  Kasai.....................260/281
3,330,834  7/1967  Senshu...................260/281
3,340,225  9/1967  Dressler.................260/281 X
3,625,947  12/1971  Nogouchi................260/281

FOREIGN PATENTS OR APPLICATIONS

39/27127  11/1964  Japan.....................260/281
39/14988  7/1964  Japan.....................260/281

OTHER PUBLICATIONS

Jour. Jap. Ind. Chem., Vol. 72, p. 1126–32, (1969).

*Primary Examiner*—Donald G. Daus
*Attorney*—Hans Berman

[57] ABSTRACT

Naphthalimide derivatives of the formula

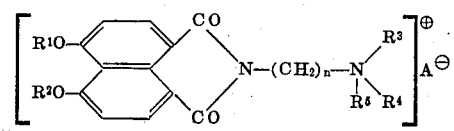

wherein $R^1$, $R^2$, $R^3$, and $R^4$ are lower alkyl, $R^5$ is hydrogen, lower alkyl or carbamoyl methyl, $n$ is 2 or 3, and A is an anionic radical, are effective optical brighteners for acrylic fibers and cellulose acetate when dyed from an acid aqueous bath. They are prepared by quaternizing corresponding tertiary amines with inorganic or organic acids, lower alkyl esters which are known alkylating agents, or chloroacetamide.

7 Claims, No Drawings

FLUORESCENT NAPHTHALIMIDE DERIVATIVES

The present invention relates to an optical brightening agent and to a process for manufacture thereof One object of this invention is to provide an optical brightening agent having a good brightening or whitening effect for textile products, especially for acrylic and cellulose acetate textile products.

There are a number of fluorescent compounds in use as optical brightening agents for textile products, especially for acrylic or cellulose acetate textile products. However, most of said compounds are not satisfactory in respect of brightening or whitening effect and light fastness, and some of them require a specific means in order to make a uniform dispersion in water.

It has been found from extended studies made by the inventors that certain naphthalimide derivatives are useful as optical brightening agents for acrylic and cellulose acetate textile products because of superior optical brightening or whitening effect, good light fastness, and ready application to textile products.

This invention provides optical brightening agents of the formula:

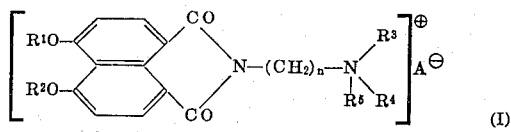

(wherein each of $R^1$, $R^2$, $R^3$ and $R^4$ represents an alkyl group containing one to four carbon atoms, $R^5$ represents hydrogen, an alkyl group containing one to four carbon atoms or carbamoyl methyl $n$ is 2 and 3 and A represents an anionic group.)

Such a compound can be made by reacting a 4,5-dialkoxy naphthalimide of the formula

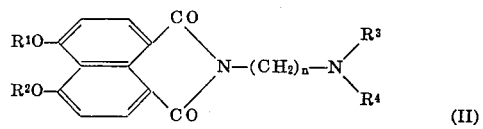

with an agent of the formula

$$R^5 A \qquad \text{III}$$

In the 4,5-dialkoxy naphthalimide having the formula I, each of the alkyl groups represented by $R^1$, $R^2$, $R^3$ and $R^4$ may be methyl, ethyl, propyl or butyl group and may be the same or different. Such imide compounds include, for example, N-dimethylaminoethyl-4,5-dimethoxynaphthalimide, N-diethylaminoethyl-4,5-dimethoxynaphthalimide, N-dimethylaminopropyl-4,5-dimethoxynapthalimide, N-diethylaminoethyl-4,5-diethoxynaphthalimide, N-dimethylaminopropyl-4,5-diethoxynaphthalimide, N-diethylaminoethyl-4,5-dipropoxynaphthalimide, N-dimethylaminopropyl-4,5-dibutoxy naphthalimide. The imide compounds can conveniently be produced by reacting a 4,5-dihalogenonaphthalimide of the formula

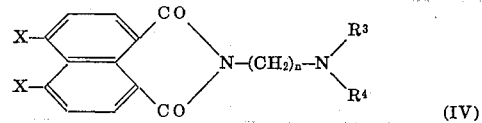

having the general formula of

$$R — OH \qquad (V)$$

(wherein R corresponds to $R^1$ or $R^2$ in formula I) in the presence of a condensing agent such as sodium hydroxide.

Agents having the with which the formula III with which the include inorganic acids, such as hydrochloric acid and sulfuric acid; organic acids, such as formic acid, monochloracetic acid and p-toluene sulfonic acid; alkyl esters of inorganic acids, such a dimethyl sulfate and diethyl sulfate; alkyl esters of arylsulfonic acids such as methyl benzenesulfonate and methyl p-toluenesulfonate; and alkyl halides, such as methyl iodide, ethyl iodide, propyl chloride, butyl bromide and chloroacetamide.

According to this invention the optical brightening agent of formula I is produced by reacting a 4,5-dialkoxy naphthalimide with the agent of formula III, in the presence of or without a solvent, at a temperature from room temperature to close to the boiling point of the solvent which may be an organic solvent, such as chloroform, acetone, methyl alcohol, ethyl alcohol, benzene and toluene, or an aqueous solvent, such as water, acetone-water, methyl alcohol-water and ethyl alcohol-water mixtures. The imide compounds can be dissolved or dispersed in the solvent. If necessary, the reaction system may be heated to an elevated temperature under pressure. The time for completion of the reaction varies over a wide range depending upon the kind of agent of formula III and the reaction temperature employed, but, in general, the reaction takes minutes to several hours. With alkyl halides and dialkyl sulfates the reaction time is one to four hours, and with an acid it is less than one hour. When the reaction is completed, a part of the solvent, if any, is distilled off, and the reaction mass is cooled to precipitate the product which is recovered by filtration, washed and dried.

The optical brightening agents according to this invention have excellent brightening properties and can be easily dissolved in water or an alcohol. The brightening agent when fixed on textile product fluoresces a blue to violet shade under sunlight and ultraviolet light.

The textile product to be treated with the optical brightening agent according to this invention may consist of polyacrylnitrile, a copolymer of acrylnitrile and a vinyl compound, such as vinyl acetate, vinyl chloride, vinyl pyridine and styrene, or cellulose acetate or be a blend of such acrylic and/or cellulose acetate fibers with cotton, wool, viscose rayon, polyester, or polyamide.

In the optical brightening of a textile product according to this invention, conventional dyeing methods can be employed. For example, the textile product may be treated in an aqueous acid solution of the naphthalimide derivative. The temperature at which the dyeing treatment is carried out varies depending upon the properties of the textile product to be treated and of the adjuvants employed, if any; in general, a temperature from room temperature to about 100°C, preferably from 80° to 100° is employed. In some cases, a temperature above 100°C under pressure can be employed. A conventional printing process can also be employed. The brightening agent can be applied to the textile product together with a suitable detergent, chemical bleaching agent or other optical brightening agent and combinations thereof.

Further, topping a dyed textile product with the brightening agent of the invention gives a more brilliant shade and increased commercial value. Since each optical brightening agent of this invention is water-soluble, the dyeing treatment can be easily carried out and the agent uniformly fixed on the textile product.

The process for manufacturing optical brightening agents of the invention and the use thereof are illustrated by means of Examples. However, it should be understood that the Examples are given only for explanation and are not intended to restrict the scope of this invention.

EXAMPLE 1

37.0g of N-dimethylaminopropyl-4,5-diethoxynaphthalimide suspended in 2,000 ml of acetone was mixed with 12.6g of dimethyl sulfate; and the mixture was refluxed for four hours with agitation. The precipitate formed upon cooling was filtered out, washed with acetone, dried and ground to a light yellow crystal powder having a melting point of 280° - 281°C. A dilute aqueous solution of the product had violet fluorescence. The product had the following structure:

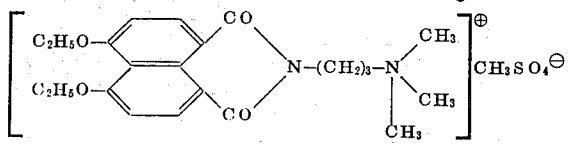

and the results of elementary analysis were:

|  | C | H | O | N | S |
|---|---|---|---|---|---|
| Calculated | 55.63 | 6.50 | 25.78 | 5.64 | 6.46 |
| Found | 54.14 | 6.70 | 25.69 | 5.46 | 6.63 |

To 5l of an aqueous solution containing 0.2g of the product so produced were added 10g of sodium chlorite and 5g of 80 percent formic acid to prepare a treating bath. 100g polyacrylonitrile fabric, which had been previously rinsed in an aqueous synthetic detergent solution, was immersed in the treating bath of 60°C, and the high temperature was raised to 100°C over a period of 20 minutes and held for 40 minutes at the temperature.

After slowly cooling to 70°C, the fabric was removed from the bath, and washed with water. Then the fabric was treated at 70°C for 20 minutes in a dechlorination bath containing about 3 liters of water and 3g of sodium bisulfite, washed with water and dried.

The brightness of the fabric so treated was far superior to the fabric treated in a similar bath without the compound of the invention. The fluorescent energy distribution of the treated fabric was tested by using a Hitachi spectrograph, type 139, with fluorescence attachment 0480 (available from Hitachi Seisakusho, Tokyo, Japan) and it was found that the maximum wave length ($\lambda$max.) was 439 m$\mu$. Light fastness of the treated fabric was tested by using a Xenon Fade-O-Meter type XF-1 (available from Toyo Rikakogyo Co. Limited, Tokyo, Japan). After 20 hours exposure no decrease of fluorescence and no yellowing of the treated fabric were observed.

EXAMPLE 2

36.5g N-diethyl aminoethyl-4,5-dimethyl naphthalimide dispersed in 400 ml of methyl alcohol was mixed with 14.2g of methyl iodide and refluxed for one hour with agitation. The crystalline precipitate formed upon cooling was filtered out, washed with acetone, dried and ground to light yellow crystals having a metling point of 234° - 236°C (decomposed). The structure and elementary analysis thereof were as follows:

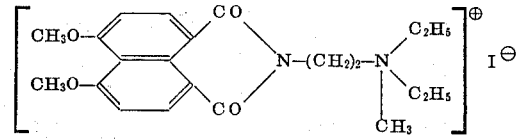

|  | C | H | O | N | I |
|---|---|---|---|---|---|
| Calculated | 50.61 | 5.46 | 12.84 | 5.62 | 25.46 |
| Found | 50.14 | 5.57 | 12.65 | 5.79 | 25.30 |

The dyeing procedure of Example 1 was followed, except that 0.2g of the abovementioned compound was employed. An excellent brightening effect on the polyacrylonitrile fabric was obtained.

The distribution of fluorescent energy of the treated fabric was measured and the maximum wave length was found to be $\lambda$ max.438 m$\mu$. After 20 hours exposure, in the Fade-O-Meter no decrease in fluorescence and no yellowing of the treated fabric was found.

EXAMPLE 3

34.8g of N-diethyl aminoethyl-4,5-diethoxynaphthalimide dissolved in 400 ml of acetone-water (1:1 by weight) was mixed with 15.4g of diethyl sulfate. The mixture was refluxed for one hour with agitation, and the solvent was distilled out. The residue was recrystallized from methyl alcohol to obtain light yellow crystals (m.p. 251° – 253°C), a dilute aqueous solution of which showed strong violet fluorescence. The structure and the elementary analysis of the product were as follows:

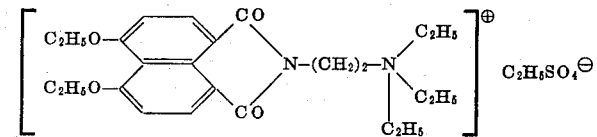

|  | C | H | O | N | S |
|---|---|---|---|---|---|
| Calculated | 57.97 | 7.11 | 23.76 | 5.20 | 5.95 |
| Found | 57.51 | 7.23 | 23.69 | 5.24 | 6.10 |

To an aqueous solution of 0.2g of the abovementioned compound in 5l of water were added 5g of acetic acid and 2.5g of sodium acetate to prepare a first bath. 100g polyacrylonitrile fabric previously rinsed in an aqueous synthetic detergent solution was immersed in the first bath at 60°C, whereupon the bath temperature was raised to 100°C over a period of 20 minutes, maintained at 100°C for 40 minutes and slowly reduced to 70°C. The fabric so treated was removed from the bath and washed with water.

The treated fabric was immersed at 60°C in a second bath, which was prepared from 5l of water, 10g of sodium chlorite and 5g of acetic acid, and then the bath temperature was raised to 100°C over a period of 20 minutes, maintained at 100°C for 40 minutes and slowly reduced to 70°C. After washing, the fabric so treated was dechlorinated as in Example 1 washed, and dried.

The fabric so treated was far superior in brightness to a fabric which was treated in a bath of sodium chlorite alone, and had a $\lambda$ max.value of 443 m$\mu$. After exposure for 20 hours in the Xenon Fade-O-Meter, no decrease in fluorescence and no yellowing of the treated fabric was found.

EXAMPLE 4

Following the procedures disclosed in Example 1, 42.7g of N-dimethylaminopropyl-4,5-dibutoxy naphthalimide and 12.6g of dimethyl sulfate were reacted in water to obtain light yellow crystals having a melting point of 188° – 190°C. The structure and elementary analysis were as follows:

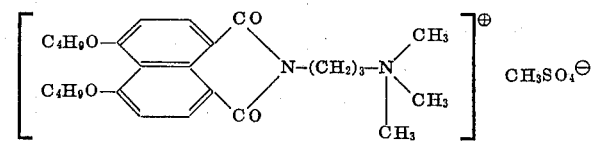

|  | C | H | O | N | S |
|---|---|---|---|---|---|
| Calculated | 58.68 | 7.30 | 23.16 | 5.07 | 5.80 |
| Found | 57.95 | 7.27 | 23.47 | 5.30 | 5.61 |

100g polyacrylonitrile fabric was treated according to the procedures set forth in Example 3 except that the first bath contained 0.2g of the abovementioned compound. Good whitening effect was obtained.

The distribution of fluorescent energy in the fabric so treated was measured and λ max. was 440 mμ. After 20 hours exposure in the Xenon Fade-O-Meter showed, no decrease in fluorescence and no yellowing was observed.

EXAMPLE 5

According to the procedures disclosed in Example 1, 34.2g of N-dimethylaminopropyl-4,5-dimethoxynaphthalimide and 12.6g of dimethyl sulfate were reacted to obtain light yellow crystals (m.p. 298° – 301° – decomposed) having the following structure and elementary analysis:

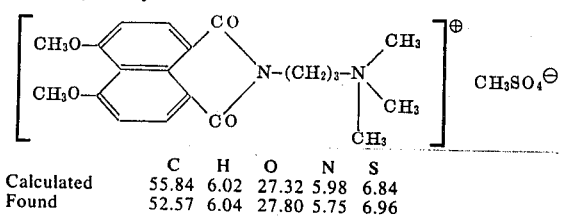

|  | C | H | O | N | S |
|---|---|---|---|---|---|
| Calculated | 55.84 | 6.02 | 27.32 | 5.98 | 6.84 |
| Found | 52.57 | 6.04 | 27.80 | 5.75 | 6.96 |

100g of cellulose acetate fabric was immersed in a treating bath of 0.2g of the abovementioned compound in about 5l of water, and the bath temperature was raised to 85°C over a period of 20 minutes and maintained at 85°C for 45 minutes. The fabric was then washed with water and dried to obtain improved brightness.

EXAMPLE 6

38.4g of N-diethylaminoethyl-4,5-diethoxynaphthalimide and 12.6g of dimethyl sulfate were reacted according to the procedures disclosed in Example 1 to obtain light yellow crystals (m.p. 192° – 195°C). The product showed a strong violet fluorescence in a dilute aqueous solution and had the following structure and elementary analysis:

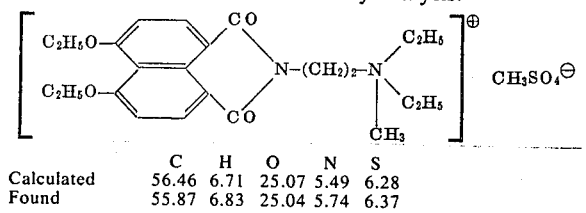

|  | C | H | O | N | S |
|---|---|---|---|---|---|
| Calculated | 56.46 | 6.71 | 25.07 | 5.49 | 6.28 |
| Found | 55.87 | 6.83 | 25.04 | 5.74 | 6.37 |

By treating a cellulose acetate fabric with the abovementioned compound according to the procedures of Example 5, a fabric with improved brightness was obtained.

EXAMPLE 7

34.2g of N-dimethylaminopropyl-4,5-dimethoxynaphthalimide suspended in 150 ml benzene and 15.4g of diethyl sulfate were mixed and refluxed for four hours with agitation. The reaction mass was cooled and the precipitate thus produced was filtered out, washed with benzene, dried and ground. The product consisted of light yellow crystals and had strong fluorescence in a dilute aqueous solution. The structure and the elementary analysis thereof were as follows:

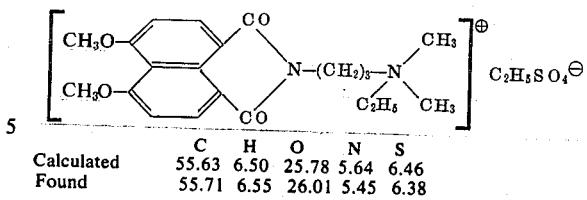

|  | C | H | O | N | S |
|---|---|---|---|---|---|
| Calculated | 55.63 | 6.50 | 25.78 | 5.64 | 6.46 |
| Found | 55.71 | 6.55 | 26.01 | 5.45 | 6.38 |

To prepare a dyeing bath, 0.2g of the compound dissolved in 5l of water and 1g of oxalic acid were mixed and heated to 60°C. 100 g polyacrylonitrile fabric previously rinsed in an aqueous synthetic detergent solution was immersed in the bath, whereupon the bath temperature was raised to 100°C over 20 minutes and maintained at 100°C for 40 minutes, then allowed to drop to 70°C. Thereafter the fabric was washed with water and dried.

The fabric so treated had greatly improved brightness in comparison to untreated fabric and after 20 hours exposure, in the Xenon Fade-O-Meter no decrease of fluorescence and no yellowing were observed. However, after steaming at 100°C for 20 minutes a slight decrease of brightness was detected.

EXAMPLE 8 – 10

According to the procedure set forth in Example 7, batches of N-dimethylaminopropyl-4,5-dimethoxynaphthalimide were reacted with 14.2g of methyl iodide, 18.6g of methyl p-toluene sulfonate and 9.4g of chloroacetamide, respectively, to obtain products A, B and C as follows.

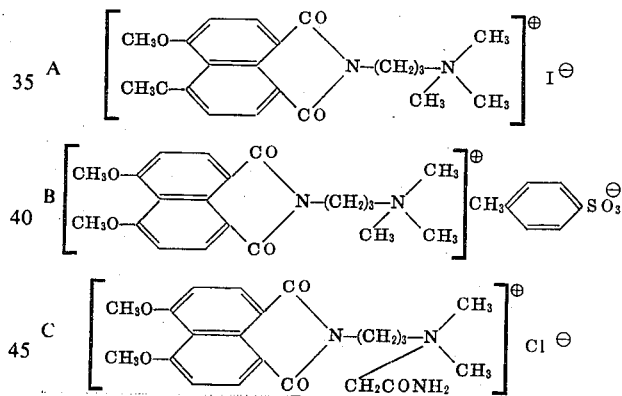

The elementary analyses and properties of these products were as follows:

TABLE 1

| Compound |  | C | H | O | N | I | S | Cl |
|---|---|---|---|---|---|---|---|---|
| A | Calculated | 49.60 | 5.20 | 13.21 | 5.78 | 26.20 | — | — |
|  | Found | 49.61 | 5.33 | 13.18 | 5.41 | 26.38 | — | — |
| B | Calculated | 61.35 | 6.10 | 21.19 | 5.30 | — | 6.07 | — |
|  | Found | 61.03 | 6.09 | 21.20 | 5.04 | — | 6.10 | — |
| C | Calculated | 57.86 | 6.01 | 18.35 | 9.64 | — | — | 8.13 |
|  | Found | 57.30 | 6.26 | 18.36 | 9.53 | — | — | 8.27 |

TABLE II

| Compound | Color of powder | melting point | fluorescence aqueous solution |
|---|---|---|---|
| A | light yellow | 251°–254°C (dec.) | violet |
| B | light yellow | 284°–286°C | violet |
| C | light yellow | 226°–228°C (dec.) | violet |

Employing the abovementioned three products, polyacrylonitrile fabrics were treated according to the procedures disclosed in Example 7 to obtain excellent light fastness, resistance to steaming and brightening effect.

EXAMPLE 11

N-dimethylaminopropyl-4,5-diethoxynaphthalimide in chloroform was reacted with gaseous hydrogen chloride to obtain a compound having the following structure and elementary analysis:

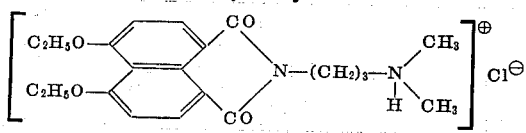

|  | C | H | O | N | Cl |
|---|---|---|---|---|---|
| Calculated | 61.99 | 6.69 | 15.73 | 6.88 | 8.71 |
| Found | 61.36 | 6.69 | 15.82 | 6.68 | 8.85 |

The compound was light yellow and crystalline having a melting point of 259° – 261°C (decomposed) and showed a strong violet fluorescence in a dilute aqueous solution.

0.1g of the compound was dissolved in 5l of water to which was added 10g of sodium chlorite and 5g of 80 percent formic acid to prepare a treating bath which was heated to 60°. 100g of polyacrylonitrile fabric was immersed in the bath the temperature of which was raised to 100°C over 20 minutes and the temperature was maintained for a further 40 minutes.

After the bath was cooled to 70°C, the fabric was removed from the bath and washed with water. Then the fabric was subjected to dechlorination treatment in a bath of 3g of sodium bisulfite and 3l of water at 70°C for 20 minutes, followed by washing and drying.

The treated fabric was superior in brightness to the fabric treated in a bath of sodium chlorite alone. The treated fabric had a λ max. value of 442 mμ and, when tested with a Xenon Fade-O-Meter showed no decrease in fluorescence and no yellowing.

EXAMPLE 12

A compound having the following structure:

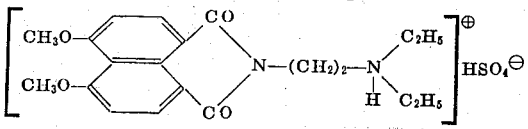

was obtained by reacting N-diethylaminoethyl-4,5-dimethoxynaphthalimide in ethyl alcohol with sulfuric acid. The compound was light yellow crystalline having a melting point of 263° – 267°C (decomposed) and showed a strong fluorescence in a dilute aqueous solution. The elementary analysis was:

|  | C | H | O | N | S |
|---|---|---|---|---|---|
| Calculated | 52.85 | 5.77 | 28.16 | 6.16 | 7.05 |
| Found | 52.21 | 5.83 | 28.35 | 6.04 | 6.92 |

A dyeing bath containing the compound so produced was prepared and polyacrylonitrile fabric was treated in the bath. Then the dyed fabric was treated with a sodium chlorite bath and then with a dechlorination bath. All the conditions set forth in Example 3 were followed except that the amount of the compound was 0.1g. Results similar to those of Example 3 as to decreasing fluorescence and yellowing were obtained.

EXAMPLE 13

A compound having the following structure

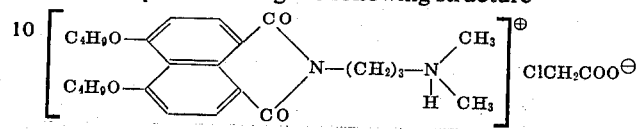

was prepared by reacting N-dimethylaminopropyl-4,5-dibutoxynaphthalimide in benzene with monochloroacetic acid. The compound was light yellow crystalline, showed strong fluorescence in a dilute aqueous solution, and gave the following elementary analysis:

|  | C | H | O | N | Cl |
|---|---|---|---|---|---|
| Calculated | 62.24 | 7.16 | 18.42 | 5.38 | 6.80 |
| Found | 62.04 | 7.11 | 18.51 | 5.29 | 6.85 |

A polyacrylonitrile fabric was treated according to the procedure set forth in Example 11 employing the compound so obtained, to obtain an excellent brightening effect.

EXAMPLE 14

A compound having the following structure

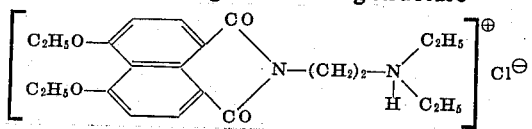

was prepared by reacting N-diethylaminoethyl-4,5-diethoxynaphthalimide in benzene with gaseous hydrogen chloride. The compound was light yellow crystalline having a melting point of 229° – 232°C (decomposed) and gave the following elementary analysis:

|  | C | H | o | N | Cl |
|---|---|---|---|---|---|
| Calculated | 62.77 | 6.94 | 15.20 | 6.65 | 8.42 |
| Found | 62.52 | 7.04 | 15.18 | 6.48 | 8.57 |

Following the procedures set forth in Example 5, a cellulose acetate fabric was treated in a bath containing 0.1g of the compound so prepared. The treated fabric had excellent brightness.

EXAMPLE 15

A compound having the structural formula of

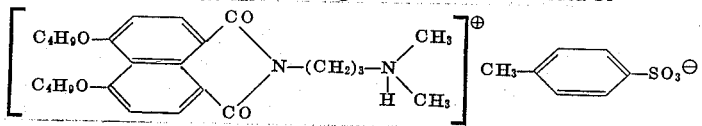

was prepared by reacting N-dimethylaminopropyl-4,5-dibutoxynaphthalimide in acetone with p-toluene sulfonic acid. The compound was light yellow and crystalline and showed strong bluish violet fluorescence in a dilute aqueous solution. The elementary analysis was:

|  | C | H | O | N | S |
|---|---|---|---|---|---|
| Calculated | 64.19 | 7.07 | 18.70 | 4.68 | 5.36 |
| Found | 64.01 | 7.13 | 18.65 | 4.82 | 5.29 |

A cellulose acetate fabric was treated according to the procedures of Example 14 employing the compound so produced to give an excellent brightening effect.

EXAMPLE 16

A compound having the structural formula

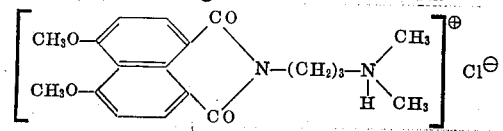

was prepared by reacting N-dimethylaminopropyl-4,5-dimethoxynaphthalimide in ethyl alcohol with gaseous hydrogen chloride. The compound was a light yellow crystal having a melting point of 256°–257°C (decomposed), showed strong violet fluorescence in a dilute aqueous solution and had the following elementary analysis:

|            | C     | H    | O     | N    | Cl   |
|------------|-------|------|-------|------|------|
| Calculated | 60.24 | 6.12 | 16.89 | 7.39 | 9.36 |
| Found      | 60.69 | 6.27 | 16.75 | 7.14 | 9.31 |

A polyacrylonitrile fabric was treated with an aqueous solution containing the compound in the manner of Example 12 to obtain an excellent brightening effect.

EXAMPLE 17

A compound of the following structure

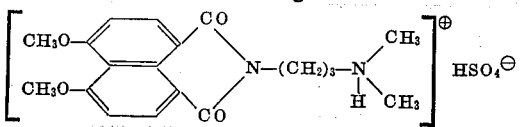

was prepared by reacting N-dimethylaminopropyl-4,5-dimethoxynaphthalimide in ethyl alcohol with sulfuric acid. The compound was a light yellow and crystalline having a melting point of 247° – 249°C, showed strong violet fluorescence in a dilute aqueous solution and the following elementary analysis:

|            | C     | H    | O     | N    | Cl   |
|------------|-------|------|-------|------|------|
| Calculated | 51.81 | 5.49 | 29.06 | 6.36 | 7.28 |
| Found      | 51.32 | 5.65 | 29.12 | 6.04 | 7.10 |

Using the compound so obtained, a cellulose acetate fabric was treated according to the procedures set forth in Example 14 to obtain an excellent brightening effect.

What is claimed is:

1. A compound of the formula

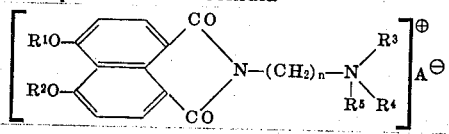

wherein $R^1$, $R^2$, $R^3$, and $R^4$ are alkyl having one to four carbon atoms, $R^1$ and $R^2$ being the same, $R^5$ is hydrogen, alkyl having one to four carbon atoms, or carbamoylmethyl, $n$ is 2 or 3, and A is Cl, Br, I, $HSO_4$, $CH_3SO_4$, $C_2H_5SO_4$, HCOO,

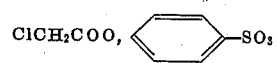

or

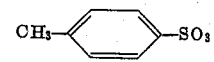

2. The compound having the formula

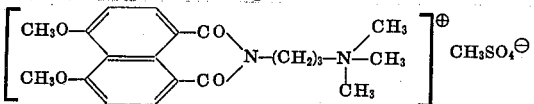

3. The compound having the formula

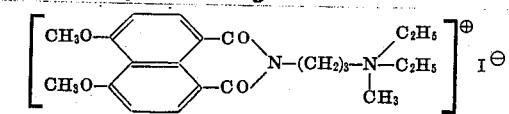

4. The compound having the formula

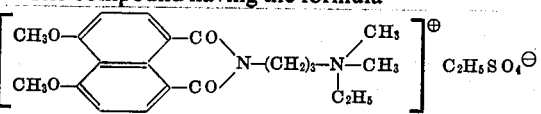

5. A compound as set forth in claim 1, wherein $R^1$, $R^2$, $R^3$, $R^4$, and $R^5$ are each methyl, and $n$ is 3.

6. A compound as set forth in claim 1, wherein $R^1$, $R^2$, and $R^5$ are methyl, and $R^3$ and $R^4$ are ethyl, and $n$ is 2.

7. A compound as set forth in claim 1, wherein $R^1$, $R^2$, $R^3$, and $R^4$ are methyl, and $R^5$ is ethyl, and $n$ is 3.

* * * * *

UNITED STATES PATENT OFFICE
CERTIFICATE OF CORRECTION

Patent No. 3,697,525  Dated October 10, 1972

Inventor(s) HITOSHI OKADA ET AL

It is certified that error appears in the above-identified patent and that said Letters Patent are hereby corrected as shown below:

Please change the last line of paragraph [30] to read --

June 27, 1968    Japan ............. 43/44712

Signed and sealed this 13th day of March 1973.

(SEAL)
Attest

EDWARD M. FLETCHER, JR.
Attesting Officer

ROBERT GOTTSCHALK
Commissioner of Patents